(No Model.)
J. S. PEIRCE.
TILE FOR PAVEMENTS AND VAULT LIGHTS.
No. 437,347. Patented Sept. 30, 1890.
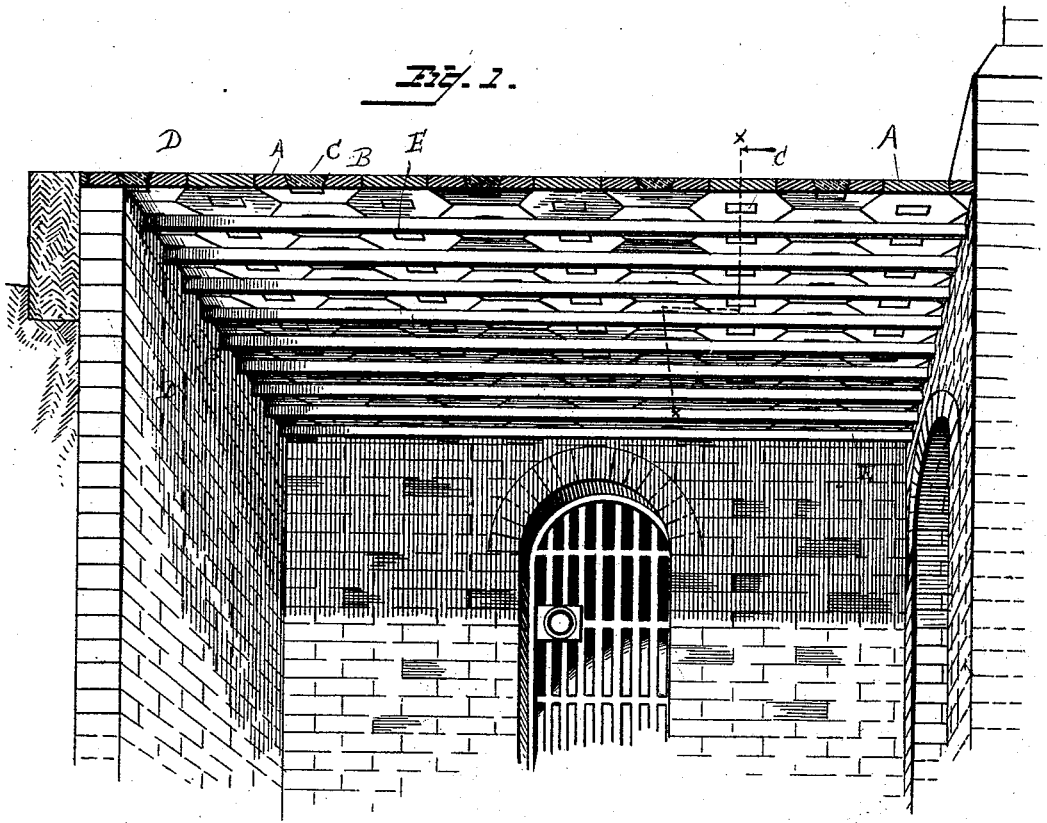
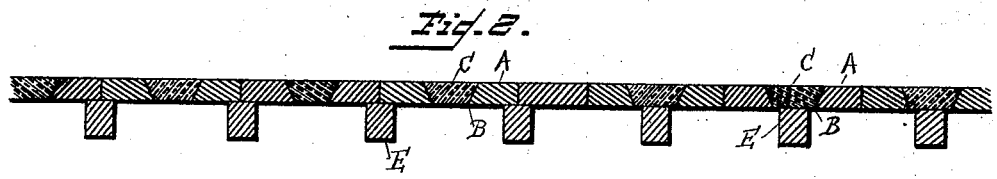
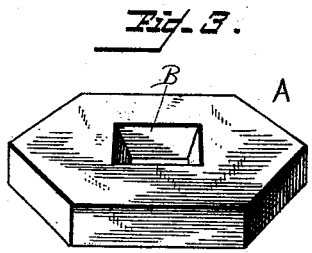 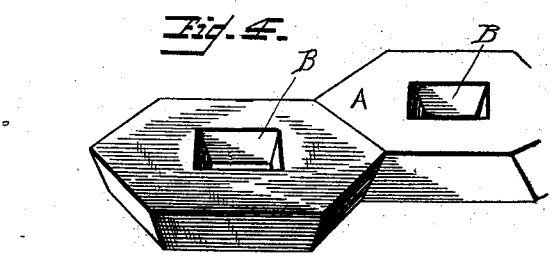
Witnesses  Inventor

UNITED STATES PATENT OFFICE.

JAMES STANWOOD PEIRCE, OF PORTSMOUTH, NEW HAMPSHIRE.

TILE FOR PAVEMENTS AND VAULT-LIGHTS.

SPECIFICATION forming part of Letters Patent No. 437,347, dated September 30, 1890.

Application filed April 3, 1890. Serial No. 346,459. (No specimens.)

*To all whom it may concern:*

Be it known that I, JAMES STANWOOD PEIRCE, a citizen of the United States, residing at Portsmouth, in the county of Rockingham and State of New Hampshire, have invented certain new and useful Improvements in Tiles for Pavements and Vault-Lights; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to footways or pavements, and has for its object to form a pavement of a composite tile made of a composition that hardens more the longer it is exposed, which will not sweat, and which will also serve to securely hold in place a glass light set in the tile, whereby is formed not only a strong and very durable footway, but also one which will shed a flood of light into the vault below, all as hereinafter described and claimed, reference being had to the accompanying drawings, forming a part hereof, in which—

Figure 1 is a perspective showing my invention as in practical use, the same being applied as a footway or pavement over a vault in front of a building. Fig. 2 is a detail showing a section of the pavement on line $x\ x$ of Fig. 1, looking in the direction of the arrow. Fig. 3 is a perspective of a single tile before the glass light is applied. Fig. 4 is a perspective showing how the tiles may be beveled on edges.

In carrying out my invention I first form a tile composed of two parts each of cement, silicious sand, gravel or its equivalent, broken stone or rock, and calcined lime, one part of alum, and one part of silicate of soda or silicate of potash, the whole being thoroughly mixed before adding water. This composition is placed in a mold of the desired configuration and having a core preferably in its middle and of tapering wedge shape in cross-section, so as to form a wedge-shaped cavity in the tile, the walls of which flare upwardly, so that the lower portion thereof will form a seat for a glass light to be set therein. After the composition has been thoroughly tamped and the tile A removed from the table and mold, it appears as shown in Fig. 3. The next step is to place the glass light C in the cavity B and secure it therein by any suitable means. To do that I prefer to use a portion of the composition composing the tile, as it affords a strong cement for the purpose and makes a hard durable surface like the other part of the face of the tile. By making the walls of the recess that receives the glass light tapering or flaring upwardly a firm seat for the glass is afforded, and any pressure or weight upon the glass light would tend only to press it more tightly to its seat.

By forming the tile itself of the composition described sweating of the tile is effectually prevented, whereby dampness in the vault below is avoided and the glass lights kept dry and free from being obscured by formation of moisture, and a clear bright light in the vault is thus maintained.

The tiles thus formed are set upon rafters or metal beams E, extending from the walls of the building to the outer wall of the vault, the outer ends of the beams resting in recesses D, formed in the outer wall, so as to bring the top edge or face of the beam substantially flush with the top face of the outer wall, so as to allow the under face of the tiles to rest upon the top of the beams and the outer wall and flush with the same, thus affording a strong and firm base for the tiles and making a close joint, which will exclude dampness and moisture. The beams are placed close enough together to permit a portion of every tile to rest thereon and to meet the edge of the tile projecting beyond the edge of the adjoining beam, thus affording a firm base for each tile and allowing the edges to meet between the beams in such a way that the space between the beams is spanned by the tiles, a portion of each of which rests upon a solid foundation, thus forming a tile pavement and also a roof to the vault having practically a solid base throughout its whole area. For illustration, as shown in the drawings, each beam will have resting upon it the central portion of a series of tiles, whose ends will project on opposite sides of the beam to meet the edges of the corresponding tiles likewise projecting from the adjoining beam, as shown in the right of Fig. 2, and also have resting upon it one edge of another series of tiles, whose other edge rests upon the adjoining beam, as shown in the left of Fig. 2. In that way a firm support is given to each tile and one is made to brace the other by their edges meeting between the beams, whereby is imparted a firmness combined with strength not otherwise attainable, and the tile pavement and roof composed of a series of tiles is made as strong and durable as if made in one single piece or composed of arches, each arch spanning the space between two beams and supported by the two beams.

The glass lights will under such a construction appear as illustrated, and, if desired, they may be formed near opposite ends of some of the tiles, so that every tile will have its glass light lying over the space between the beams, and thus afford that much additional light to the vault below.

If desired, the edges of the tiles may be beveled, as shown in Fig. 4, so that the edge of one tile will rest upon the adjoining tile with the faces of the tiles flush, thus causing some of the tiles to support others, and to that extent to form a more compact union and firm foundation for the whole.

The construction described provides for the tiles being made smaller than otherwise necessary, so that there will be less waste of material than where it is necessary to cut down arches or large blocks to the required size for the particular area to be covered, whereby results great saving in the cost of the material and also in the construction of the pavement. Besides, no special frames must be made to receive and hold the tiles, which frames can be dispensed with without detracting from the strength of the pavement.

Having described my invention and set forth its merits, what I claim is—

1. The within-described tile, composed of cement, silicious sand, gravel, or broken stone, silicate of soda or potash, and containing a solid piece of glass, substantially as and for the purposes set forth.

2. A pavement and vault-light cover composed of a series of beams, in combination with a series of tiles containing glass lights, said tiles being arranged so that a portion of each tile will rest upon the top of said beams with the edges of the tile meeting between said beams to close the space on opposite sides of the beams by the portions of the tiles projecting from opposite sides of the beams, substantially as described.

In testimony whereof I affix my signature in presence of two witnesses.

JAMES STANWOOD PEIRCE.

Witnesses:
FRED F. LACEY,
JAS. M. HARRIS.